United States Patent
Kao et al.

(10) Patent No.: US 11,832,146 B2
(45) Date of Patent: Nov. 28, 2023

(54) ELECTRONIC DEVICE AND METHOD FOR IMPROVING ANGLE OF ARRIVAL OF A SIGNAL

(71) Applicant: Quanta Computer Inc., Taoyuan (TW)

(72) Inventors: Po-Shan Kao, Taoyuan (TW); Cheng-Yang Tseng, Taoyuan (TW); Wan-An Yang, Taoyuan (TW); Yan-Cheng Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 288 days.

(21) Appl. No.: 17/204,327

(22) Filed: Mar. 17, 2021

(65) Prior Publication Data
US 2022/0141617 A1  May 5, 2022

(30) Foreign Application Priority Data
Nov. 5, 2020 (TW) ................................. 109138518

(51) Int. Cl.
| H04W 4/02 | (2018.01) |
| G01S 5/04 | (2006.01) |
| G01S 3/26 | (2006.01) |
| G01S 3/74 | (2006.01) |
| H04W 64/00 | (2009.01) |

(52) U.S. Cl.
CPC ............... *H04W 4/023* (2013.01); *G01S 3/26* (2013.01); *G01S 3/74* (2013.01); *G01S 5/04* (2013.01); *H04W 64/006* (2013.01)

(58) Field of Classification Search
CPC ..... H04W 4/023; H04W 64/006; H04W 4/33; H04W 4/025; H04W 4/021; G01S 3/26; G01S 3/74; G01S 5/04; G01S 5/0205; G01S 5/0215; G01S 5/0218; G01S 3/28; G01S 3/46
USPC ............................................... 455/456.1–457
See application file for complete search history.

(56) References Cited

U.S. PATENT DOCUMENTS

| 2013/0076566 | A1* | 3/2013 | Jiang ..................... H01Q 25/00 342/373 |
| 2014/0159954 | A1* | 6/2014 | Stoddard ................. G01S 3/023 342/359 |
| 2016/0345286 | A1* | 11/2016 | Jamieson .................. G01S 3/48 |
| 2017/0227623 | A1* | 8/2017 | Park .......................... G01S 3/46 |
| 2020/0132798 | A1* | 4/2020 | Tomioka ................... G01S 3/50 |

* cited by examiner

*Primary Examiner* — Michael Y Mapa
(74) *Attorney, Agent, or Firm* — McClure, Qualey & Rodack, LLP

(57) ABSTRACT

An electronic device includes an indoor positioner and a positioning engine server. The indoor positioner has an antenna array including a plurality of antenna units. The indoor positioner divides the antenna units into multiple antenna unit groups, receives a wireless signal from user equipment at each time point via the antenna unit groups, and calculates a plurality of angles of arrival (AOA) corresponding to the antenna unit groups at each time point. The positioning engine server receives and stores the angles of arrival corresponding to the antenna unit groups at each time point, and filters the angles of arrival according to the angle sizes of the angles of arrival corresponding to the antenna unit groups at each time point stored in an observation period.

6 Claims, 4 Drawing Sheets

ELECTRONIC DEVICE AND METHOD FOR IMPROVING ANGLE OF ARRIVAL OF A SIGNAL

CROSS REFERENCE TO RELATED APPLICATIONS

This application claims priority to and the benefit of Taiwan Application No. 109138518, filed on Nov. 5, 2020, the entirety of which is incorporated by reference herein.

FIELD OF THE INVENTION

The invention relates to an image annotation standardization method, and in particular it is related to an electronic device and a method for improving the angle of arrival of a signal.

DESCRIPTION OF THE RELATED ART

In indoor positioning technology, no matter what kind of radio frequency technology (such as Wi-Fi, Bluetooth, UWB or ZigBee) is being employed, or what kind of algorithm (such as RSSI, angle of arrival (AoA), time of arrival (ToA), and time difference of arrival (TDOA)) is being used for indoor positioning, it is susceptible to many sources of interference that reduces the accuracy and stability of the positioning process. Examples of interference include the multipath effect and the co-channel interference (CCI), and these can even affect the platform noise of the positioning hardware itself.

The technology currently considered to be the most accurate is the angle of arrival (AoA) algorithm. In order to improve the coordinate accuracy of indoor positioning in an interference-heavy environment, finding a way to improve the accuracy of calculating incident angle and positioning coordinates based on the signal angle of arrival (AoA) algorithm has become an important issue.

BRIEF SUMMARY OF THE INVENTION

In order to resolve the issue described above, an embodiment of the invention provides an electronic device that includes an indoor positioner and a positioning engine server. The indoor positioner has an array antenna that includes a plurality of antenna units. The indoor positioner divides the antenna units into multiple antenna unit groups, uses the antenna unit groups to receive a wireless signal from user equipment at each time point, and calculates a plurality of angles of arrival (AOA) corresponding to the antenna unit groups. The positioning engine server receives and stores the angles of arrival corresponding to the antenna unit groups at each time point, and filters the angles of arrival according to the angle sizes of the angles of arrival corresponding to the antenna unit groups at each time point stored in an observation period.

According to the electronic device disclosed above, the indoor positioner switches the polarization directions of the antenna unit groups at each time point, so that the antenna unit groups receive the wireless signal from the user equipment at different polarization directions, so as to increase the number of angles of arrival, calculated by the indoor positioner, corresponding to the antenna unit groups at each time point.

According to the electronic device disclosed above, the indoor positioner includes a controller. The controller divides the antenna units into a first direction antenna unit group, a second direction antenna unit group, a third direction antenna unit group, and a fourth direction antenna unit group according to the relative positional relationship of at least two of the antenna units in the array antenna.

According to the electronic device disclosed above, the positioning engine server calculates a trim mean corresponding to the angles of arrival from the first direction antenna unit group, the second direction antenna unit group, the third direction antenna unit group, and the fourth direction antenna unit group at each time point stored in the observation period, so as to delete outliers in the angles of arrival.

According to the electronic device disclosed above, the positioning engine server calculates a standard deviation corresponding to the angles of arrival from the first direction antenna unit group, the second direction antenna unit group, the third direction antenna unit group, and the fourth direction antenna unit group at each time point stored in the observation period, and deletes the outliers in the angles of arrival according to the standard deviation.

According to the electronic device disclosed above, the positioning engine server calculates a second trim mean corresponding to the angles of arrival from the first direction antenna unit group, the second direction antenna unit group, the third direction antenna unit group, and the fourth direction antenna unit group at each time point stored in the observation period, and deletes the outliers in the angles of arrival according to the second trim mean.

According to the electronic device disclosed above, the positioning engine server only reserves the one angle of arrival that corresponds to the first direction antenna unit group that is closest to the second trim value, the one angle of arrival that corresponds to the second direction antenna unit group that is closest to the second trim value, the one angle of arrival that corresponds to the third direction antenna unit group that is closest to the second trim value, and the one angle of arrival that corresponds to the fourth direction antenna unit group that is closest to the second trim value.

According to the electronic device disclosed above, the positioning engine server calculates a first covariance corresponding to the one angle of arrival of the first direction antenna unit group at each time point in the observation period, a second covariance corresponding to the one angle of arrival of the second direction antenna unit group at each time point in the observation period, a third covariance corresponding to the one angle of arrival of the third direction antenna unit group at each time point in the observation period, and a fourth covariance corresponding to the one angle of arrival of the fourth direction antenna unit group at each time point in the observation period.

According to the electronic device disclosed above, the positioning engine server compares the first covariance, the second covariance, the third covariance, and the fourth covariance, and selects at least two from the one angle of arrival of the first direction antenna unit group, the one angle of arrival of the second direction antenna unit group, the one angle of arrival of the third direction antenna unit group, and the one angle of arrival of the fourth direction antenna unit group according to a comparison result as the basis for calculating a positioning location.

The present invention also provides a method suitable for an indoor positioner and a positioning engine server. The indoor positioner incudes an array antenna including a plurality of antenna units. The method includes: dividing the antenna units into multiple antenna unit groups; receiving, via the antenna unit groups, a wireless signal from user equipment at each time point; calculating a plurality of angles of arrival (AOA) corresponding to the antenna unit groups at each time point; receiving and storing the angles of arrival corresponding to the antenna unit groups at each time point; and filtering the angles of arrival according to the angle sizes of the angles of arrival corresponding to the antenna unit groups at each time point stored in an observation period.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE INVENTION

In any case, a person skilled in the art may realize that this disclosure can still be implemented without one or more details or with other methods. For other examples, well-known structures or operations are not listed in detail to avoid confusion of this disclosure. The present disclosure is not limited by the described behavior or sequence of events, for example, some behaviors may occur in a different sequence or occur simultaneously under other behaviors or events. In addition, not all described actions or events need to be executed in the same method as the existing disclosure.

Figure 1:
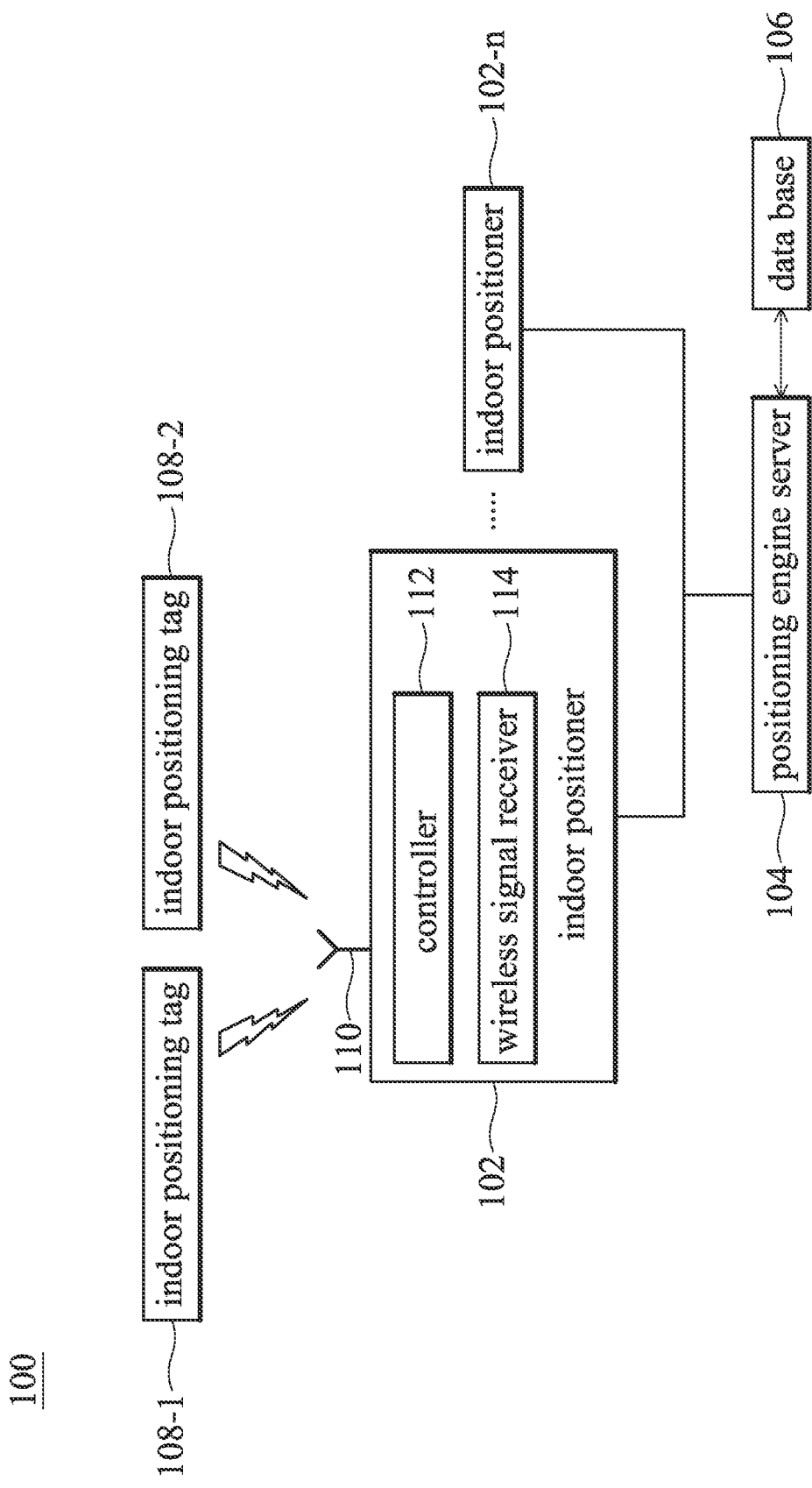
FIG. 1 is a schematic diagram of an indoor positioning system 100 in accordance with some embodiments of the disclosure.

FIG. 1 is a schematic diagram of an indoor positioning system 100 in accordance with some embodiments of the disclosure. As shown in FIG. 1, the indoor positioning system 100 includes a plurality of indoor positioners 102, . . . , 102-n, a positioning engine server 104, a data base 106, and indoor positioning tags 108-1 and 108-2. In some embodiments, the indoor positioner 102, . . . , 102-n can be installed in different positions indoors (for example, in a corridor, a corner of a walkway, a staircase, or a room). Taking the indoor positioner 102 as an example, the indoor positioner 102 includes an array antenna 110, a controller 112, and a wireless signal receiver 114. The array antenna 110 receives a wireless signal (such as Bluetooth beacons) transmitted from the indoor positioning tags 108-1 and 108-2. In some embodiments, the array antenna 110 includes a plurality of antenna units. The indoor positioner 102 calculates angles of arrival of the indoor positioning tags 108-1 and 108-2 according to the reception strength and reception phase of the wireless signal received by the antenna units of the array antenna 110.

In some embodiments, the controller 112 of the indoor positioner 102 controls some or all of the antenna units in the array antenna 110 to receive the wireless signal from the indoor positioning tags 108-1 and 108-2. The wireless signal receiver 114 of the indoor positioner 102 demodulates and decodes the wireless signal received by the array antenna 110 to obtain user status information contained in the wireless signal, including acceleration magnitude, acceleration direction, and so on. The positioning engine server 104 stores the angles of arrival information from the indoor positioners 102, . . . , 102-n in the data base 106, so as to calculate and determine the position of each indoor positioning tag 108-1 and 108-2 according to the received angles of arrival information from the indoor positioners 102, . . . , 102-n, and finally completes the positioning of the indoor positioning tags 108-1 and 108-2. In some embodiments, the data base 106 is a non-volatile storage device that can store the angles of arrival of the indoor positioning tags 108-1 and 108-2 calculated by the indoor positioner 102 at each time point.

In some embodiments, the indoor positioning tags 108-1 and 108-2 can be arranged on user equipment, for example, can be built in a smart mobile device worn by the user or in a card for identification. The indoor positioning tags 108-1 and 108-2 continuously and periodically transmit wireless signals to the indoor positioners 102, . . . , 102-n installed in different positions as the user moves. Each indoor positioning tags 108-1 and 108-2 includes a gravity sensor (not shown) and a wireless signal transmitter (not shown), so that the wireless signals transmitted by the indoor positioning tags 108-1 and 108-2 can carry user status information, but the present invention is not limited thereto.

Figure 2:
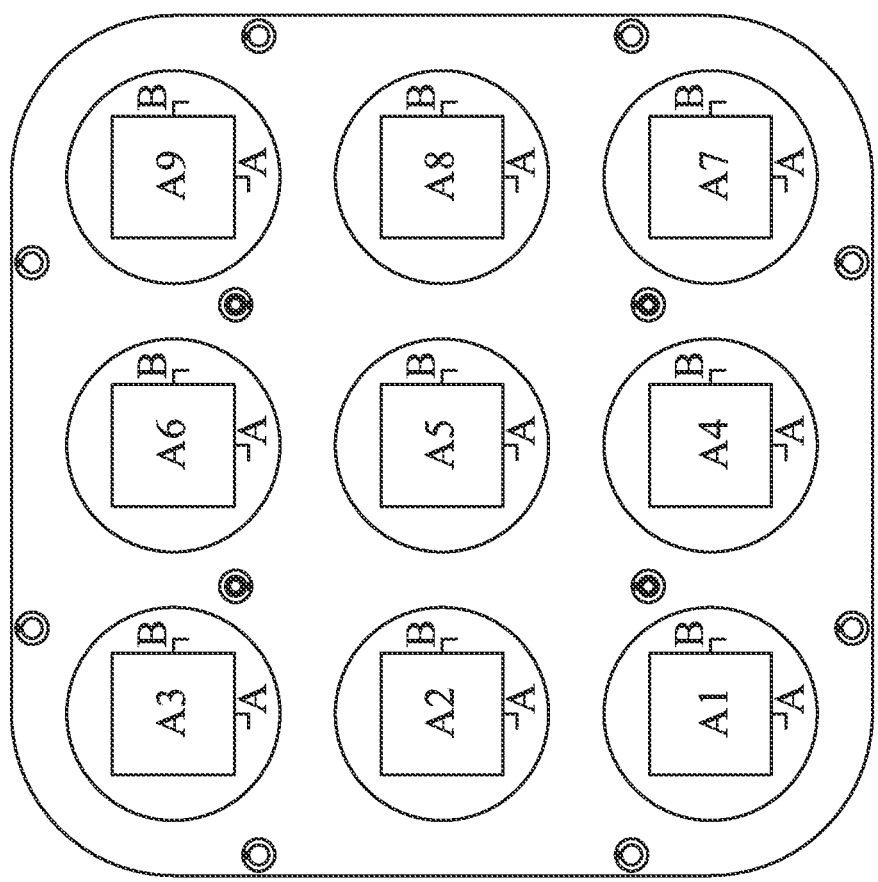
FIG. 2 is a schematic diagram of an array antenna 110 of an indoor positioner 102 in FIG. 1 in accordance with some embodiments of the disclosure.

FIG. 2 is a schematic diagram of an array antenna 110 of an indoor positioner 102 in FIG. 1 in accordance with some embodiments of the disclosure. As shown in FIG. 2, the array antenna 110 includes 9 antenna units, such as antenna units A1-A9. The present invention takes the array antenna 110 with 3*3 antenna units as an example, but the present invention is not limited thereto. In some embodiments, the controller 112 of the indoor positioner 102 is connected to the 9 antenna units of the array antenna 110 through a multiplexer (not shown). In some embodiments, the controller 112 outputs a control signal to the multiplexer, so that the multiplexer correspondingly switches the antenna units needed to receive the wireless signal according to the control signal.

In some embodiments, the controller 112 of the indoor positioner 102 switches the polarization directions of antenna units A1-A9 (for example, the polarization direct A and the polarization direction B) according to the measurement requirements. For example, each of antenna units A1-A9 has more than two feeding points. The multiplexer coupled between the controller 112 and antenna units A1-A9 can switch the different feeding points of antenna units A1-A9 to change the polarization direction of antenna units A1-A9.

Figure 3:
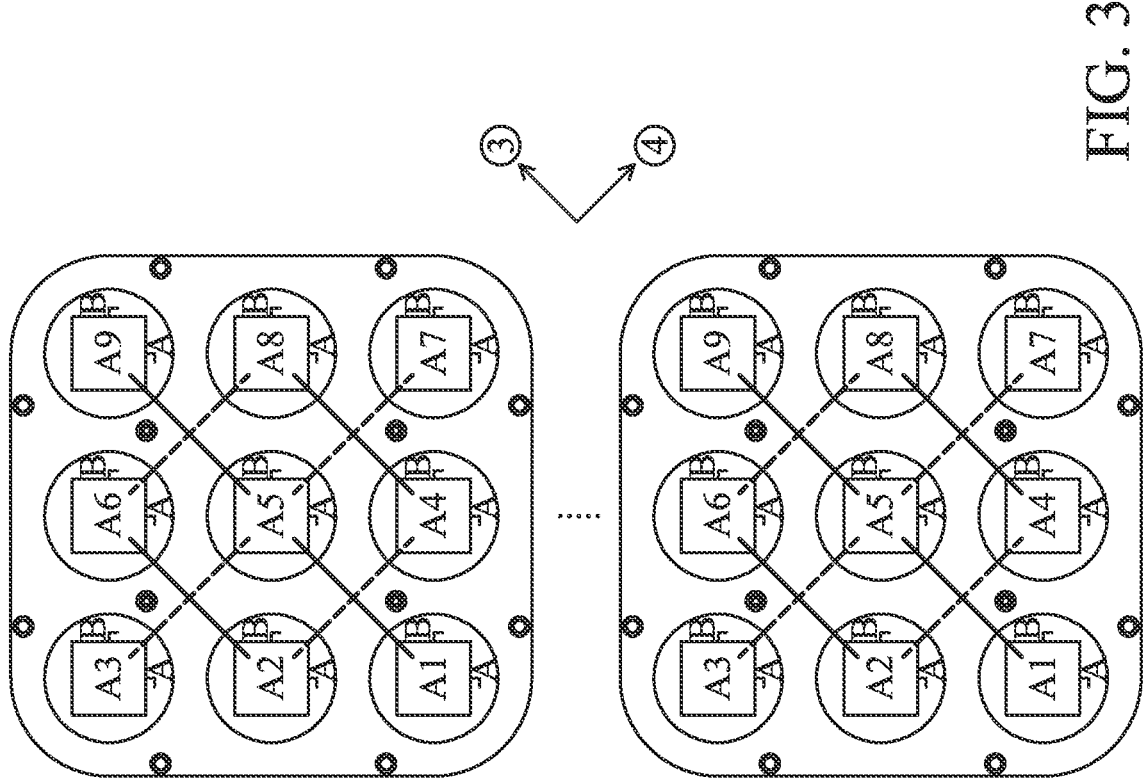
FIG. 3 is a schematic diagram of dividing a plurality of antenna units in the array antenna 110 by a controller 112 of the indoor positioner 102 in FIG. 1 in accordance with some embodiments of the disclosure.
Figure 3:
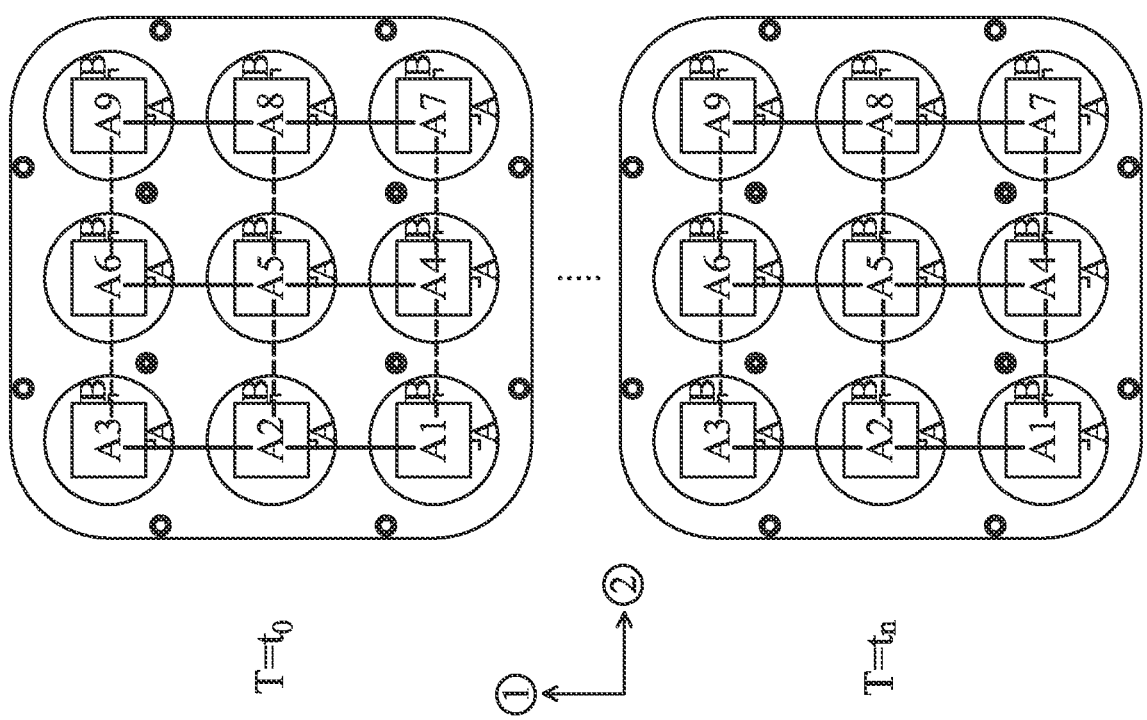

FIG. 3 is a schematic diagram of dividing a plurality of antenna units in the array antenna 110 by a controller 112 of the indoor positioner 102 in FIG. 1 in accordance with some embodiments of the disclosure. In some embodiments, the controller 112 of the indoor positioner 102 can be a microprocessor. As shown in FIG. 3, at time point t0, the controller 112 of the indoor positioner 102 divides antenna units A1 and A2, antenna units A4 and A5, antenna units A7 and A8, antenna units A2 and A3, antenna units A5 and A6, and antenna units A8 and A9 into a direction ① antenna unit group. In other words, the controller 112 of the indoor positioner 102 calculates a plurality of angles of arrival corresponding to antenna units A1 and A2, A4 and A5, A7 and A8, A2 and A3, A5 and A6, and A8 and A9 at time point t0 according to the reception parameters of the wireless signal from the user equipment received by the direction ① antenna unit group. For example, the controller 112 calculates the angle of arrival corresponding to antenna units A1 and A2 at time point t0 according to the reception parameters (such as the receiving strength and the receiving phase) of the wireless signal from the user equipment received by antenna units A1 and A2.

At time point to, the controller 112 of the indoor positioner 102 divides antenna units A1 and A4, antenna units A4 and A7, antenna units A2 and A5, antenna units A5 and A8, antenna units A3 and A6, and antenna units A6 and A9 into a direction ② antenna unit group. The controller 112 of the indoor positioner 102 calculates a plurality of angles of arrival corresponding to antenna units A1 and A4, A4 and A7, A2 and A5, A5 and A8, A3 and A6, and A6 and A9 at time point t0 according to the reception parameters (such as the receiving strength and the receiving phase) of the wireless signal from the user equipment received by the direction ② antenna unit group.

The controller 112 of the indoor positioner 102 divides antenna units A1 and A5, antenna units A4 and A8, antenna units A2 and A6, and antenna units A5 and A9 into a direction ③ antenna unit group. The controller 112 of the indoor positioner 102 calculates a plurality of angles of arrival at time point to corresponding to antenna units A1 and A5, A4 and A8, A2 and A6, and A5 and A9 according to the reception parameters of the wireless signal from the user equipment received by the direction ③ antenna unit group.

Similarly, the controller 112 of the indoor positioner 102 divides antenna units A2 and A4, antenna units A5 and A7, antenna units A3 and A5, and antenna units A6 and A8 into a direction ④ antenna unit group. The controller 112 of the indoor positioner 102 calculates a plurality of angles of arrival at time point to corresponding to antenna units A1 and A5, A4 and A8, A2 and A6, and A5 and A9 according to the reception parameters of the wireless signal from the user equipment received by the direction antenna unit group. In some embodiments, the controller 112 of the indoor positioner 102 executes a multiple signals classification (MUSIC) algorithm to convert the received parameters corresponding to the direction ① antenna unit group, the direction ② antenna unit group, the direction ③ antenna unit group, and the direction ④ antenna unit group into the corresponding plurality of angles of arrival.

Similarly, at time point to, the controller 112 of the indoor positioner 102 receives the wireless signal from the user equipment by the direction ① antenna unit group, the direction ② antenna unit group, the ③ direction antenna unit group, and the direction ④ antenna unit group respectively, so as to calculate the plurality of angles of arrival corresponding to the direction ① antenna unit group (i.e., antenna units A1 and A2, A4 and A5, A7 and A8, A2 and A3, A5 and A6, and A8 and A9), the direction ② antenna unit group (i.e., antenna units A1 and A4, A4 and A7, A2 and A5, A5 and A8, A3 and A6, and A6 and A9), the direction ③ antenna unit group (i.e., antenna units A1 and A5, A4 and A8, A2 and A6, and A5 and A9), and the direction ④ antenna unit group (i.e., antenna units A2 and A4, A5 and A7, A3 and A5, and A6 and A8).

In some embodiments, the controller 112 of the indoor positioner 102 switches the polarization directions of the direction ① antenna unit group, the direction ② antenna unit group, the direction ③ antenna unit group, and the direction ④ antenna unit group at each time point, so that the above-mentioned antenna unit groups receive the wireless signal from the user equipment, so as to increase the number of angles of arrival corresponding to the above-mentioned antenna unit groups at each time point calculated by the controller 112 of the indoor positioner 102. In some embodiments, using two of antenna units A1-A9 to receive the wireless signal from the user equipment at each time point by the controller 112 of the indoor positioner 102 of the present invention is only as an example of the present invention. The person skilled in the art understands that the controller 112 of the indoor positioner 102 can also use more than three of antenna units A1-A9 to receive the wireless signal at each time point.

Then, the positioning engine server 104 receives and stores the angles of arrivals corresponding to the direction ① antenna unit group, the direction ② antenna unit group, the direction ③ antenna unit group, and the direction ④ antenna unit group at each time point (such as time points $t_0, \ldots, t_n$). In some embodiments, the positioning engine server 104 stores the angles of arrival corresponding to the direction ① antenna unit group, the direction ② antenna unit group, the direction ③ antenna unit group, and the direction ④ antenna unit group at each time point in the data base 106. The positioning engine server 104 filters the angles of arrival according to the angle sizes of the angles of arrival corresponding to the direction ① antenna unit group, the direction ② antenna unit group, the direction ③ antenna unit group, and the direction ④ antenna unit group at each time point stored in an observation period.

For example, the angles of arrival corresponding to antenna units A1 and A2 in the direction ① antenna unit group at each time point (such as from time points $t_0$ to $t_{10}$) are stored in the data base 106. For example, the data base 106 stores an angle of arrival $a_1$ at time point $t_0$, an angle of arrival $a_2$ at time point $t_1$, an angle of arrival $a_3$ at time point $t_2, \ldots$, and an angle of arrival $a_{n+1}$ at time point $t_n$. The positioning engine server 104 filters the angles of arrival according to the angle sizes of the angles of arrival corresponding to antenna units A1 and A2 in the direction ① antenna unit group at each time point in the observation period (such as from time points $t_0$ to $t_{10}$). In other words, the positioning engine server 104 compares the historical data corresponding to the angles of arrival of antenna units A1 and A2 during the observation period (for example, hundreds of milliseconds or several seconds, or different setting according to the mobility of the indoor positioning tag 108-1) to delete the outliers in the angles of arrival corresponding to antenna units A1 and A2.

In some embodiments, the positioning engine server 104 calculates a trim mean corresponding to the angles of arrival from antenna units A1 and A2 in the direction ① antenna unit group at each time point (such as from time points $t_0$ to $t_{10}$), so as to delete outliers in the angles of arrival. For example, the positioning engine server 104 discards the highest 10% and lowest 10% of the angles of arrival $a_0$-$a_9$, that is, the highest and lowest angles of arrival in the angles of arrival $a_0$-$a_9$ are discarded. The positioning engine server 104 calculates an average value of the remaining 8 angles of arrival, and obtains the trim mean, which is used as the angle of arrival corresponding to antenna units A1 and A2 in the direction ① antenna unit group.

After that, the positioning engine server 104 also calculates the trim mean of the corresponding angles of arrival in the observation period to obtain the angles of arrival from antenna units A4 and A5, A7 and A8, A2 and A3, A5 and A6, and A8 and A9 in the direction ① antenna unit group, to obtain the angles of arrival from antenna units A1 and A4, A4 and A7, A2 and A5, A5 and A8, and A3 and A6 in the direction ② antenna unit group, to obtain the angles of arrival from antenna units A1 and A5, A4 and A8, A2 and A6, and A5 and A9 in the direction ③ antenna unit group, and to obtain the angles of arrival from antenna units A2 and A4, A5 and A7, A3 and A5, and A6 and A8 in the direction ④ antenna unit group.

In some embodiments, the positioning engine server 104 can also filter the angles of arrival by Wiener filter, Savotzky-Golay smoothing filter, Kalman filter, moving average filter, convolution calculation, correlative mean field filtering, coherence calculation, and cross-correlation calculation.

Then, the positioning engine server 104 calculates a standard deviation corresponding to the angles of arrival from the direction ① antenna unit group, the direction ② antenna unit group, the direction ③ antenna unit group, and the direction ④ antenna unit group at each time point (such as from time points $t_0$ to $t_{10}$) stored in the observation period, and deletes the outliers in the angles of arrival according to the standard deviation. For example, the positioning engine server 104 calculates a standard deviation of the angles of arrival from antenna units A1 and A2, A4 and A5, A7 and A8, A2 and A3, A5 and A6, and A8 and A9 in the direction ① antenna unit group, the angles of arrival from antenna units A1 and A4, A4 and A7, A2 and A5, A5 and A8, A3 and A6, and A6 and A9 in the direction ② antenna unit group, the angles of arrival from antenna units A1 and A5, A4 and A8, A2 and A6, and A5 and A9 in the direction ③ antenna unit group, and the angles of arrival from antenna units A2 and A4, A5 and A7, A3 and A5, and A6 and A8 in the direction ④ antenna unit group.

When the angle of arrival is greater than or less than a threshold (for example, greater than the absolute value of one standard deviation), the positioning engine server 104 discards the angle of arrival. For example, after the above method of calculating the standard deviation, the positioning engine server 104 discards the angles of arrival corresponding to antenna units A1 and A2, A2 and A3, and A5 and A6 in the direction ① antenna unit group, discards the angle of arrival corresponding to antenna units A3 and A6 in the direction ② antenna unit group, discards the angle of arrival corresponding to antenna units A2 and A6 in the direction ③ antenna unit group, and discards the angles of arrival corresponding to antenna units A3 and A5, and A6 and A8 in the direction ④ antenna unit group.

In other words, taking the materials illustrated in FIG. 3 as an example, the positioning engine server 104 reserves the angles of arrival corresponding to antenna units A4 and A5, A7 and A8, and A8 and A9 in the direction ① antenna unit group, reserves the angles of arrival corresponding to antenna units A1 and A4, A4 and A7, A2 and A5, A5 and A8, and A6 and A9 in the direction ② antenna unit group, reserves the angles of arrival corresponding to antenna units A1 and A5, A4 and A8, and A5 and A9 in the direction ③ antenna unit group, and reserves the angles of arrival corresponding to antenna units A2 and A4, and A5 and A7 in the direction ④ antenna unit group.

Then, the positioning engine server 104 calculates a second trim mean corresponding to the angles of arrival from antenna units A4 and A5, A7 and A8, and A8 and A9 in the direction ① antenna unit group, the angles of arrival from antenna units A1 and A4, A4 and A7, A2 and A5, A5 and A8, and A6 and A9 in the direction ② antenna unit group, the angles of arrival from antenna units A1 and A5, A4 and A8, and A5 and A9 in the direction ③ antenna unit group, and the angles of arrival from antenna units A2 and A4, and A5 and A7 in the direction ④ antenna unit group at each time point (such as from time points $t_0$ to $t_{10}$) stored in the observation period, and deletes the outliers in the angles of arrival according to the second trim mean.

For example, when the angle of arrival from antenna units A7 and A8 in the direction ① antenna unit group is the closest to the second trim mean, the angle of arrival from the antenna units from antenna units A2 and A5 in the direction ② antenna unit group is the closest to the second trim mean, the angle of arrival from the antenna units from antenna units A1 and A5 in the direction ③ antenna unit group is the closest to the second trim mean, and the angle of arrival from the antenna units from antenna units A5 and A7 in the direction ④ antenna unit group is the closest to the second trim mean, the positioning engine server 104 only reserves the angle of arrival from antenna units A7 and A8 in the direction ① antenna unit group, the angle of arrival from antenna units A2 and A5 in the direction ② antenna unit group, the angle of arrival from antenna units A1 and A5 in the direction ③ antenna unit group, and the angle of arrival from antenna units A5 and A7 in the direction ④ antenna unit group, and deletes the angles of arrival from other antenna unit pairs. The method of filtering the angles of arrival by the above standard deviation and the above trim mean can filter out the angles of arrival obtained due to the multipath effect, thereby increasing the accuracy of subsequent positioning.

Finally, the positioning engine server 104 calculates a covariance C1 corresponding to the angle of arrival from antenna units A7 and A8 in the direction ① antenna unit group at each time point (such as from time points $t_0$ to $t_{10}$) in the observation period, a covariance C2 corresponding to the angle of arrival from antenna units A2 and A5 in the direction ② antenna unit group at each time point in the observation period, a covariance C3 corresponding to the angle of arrival from antenna units A1 and A5 in the direction ③ antenna unit group at each time point in the observation period, and a covariance C4 corresponding to the angle of arrival from antenna units A5 and A7 in the direction ④ antenna unit group at each time point in the observation period. Then, the positioning engine server 104 compares the covariance C1, C2, C3 and C4 to select two covariance with the best correlation, and uses the angles of arrival from the antenna units corresponding to the two selected covariance as the basis for subsequent calculation of the positioning location.

For example, when the positioning engine server 104 determines that the covariance C2 and C4 have the best correlation, the positioning engine server 104 selects the angle of arrival corresponding to antenna units A2 and A5 in the direction ② antenna unit group and the angle of arrival corresponding to antenna units A5 and A7 in the direction ④ antenna unit group as the basis for subsequent calculation of the positioning. In some embodiments, the positioning engine server 104 inputs the angle of arrival from antenna units A2 and A5 in the direction ② antenna unit group and the angle of arrival from antenna units A5 and A7 in the direction ④ antenna unit group into an interacting multiple mode (IMM) algorithm to get a positioning location.

In some embodiments, the positioning engine server 104 performs permutation and combination on the angle of arrival from antenna units A7 and A8 in the direction ① antenna unit group, the angles of arrival from antenna units A2 and A5 in the direction ② antenna unit group, the angles of arrival from antenna units A1 and A5 in the direction ③ antenna unit group, and the angles of arrival from antenna units A5 and A7 in the direction ④ antenna unit group, and inputs any two of the above-mention angles of arrival from different antenna unit groups into the interacting multiple mode (IMM) algorithm, so that 6 positioning locations (i.e., $C_2^4=6$) are obtained.

After that, the positioning engine server 104 sequentially executes the following steps. First, the positioning engine server 104 calculates the distance between the above 6 positioning locations and the indoor positioner 102, and sets the positioning points that are more than 6 meters away from the indoor positioner 102 as invalid positioning points, which exceed the effective positioning range. Second, the positioning engine server 104 calculates the distance between the above 6 positioning points and the indoor positioner 102 according to RSSI of the wireless signal received by antenna units A7 and A8 in the direction ① antenna unit group, antenna units A2 and A5 in the direction ② antenna unit group, antenna units A1 and A5 in the direction ③ antenna unit group, and antenna units A5 and A7 in the direction ④ antenna unit group. For example, if the converted distance based on the RSSI is 2 meters, then all the positioning points 1.5~2.5 meters way from the indoor positioner 102 are effective positioning points. Otherwise, they are invalid positioning point. Third, the positioning engine server 104 selects (plural) effective positioning points within one meter from the indoor positioner 102 among the above 6 positioning points, and calculates the center of gravity of the (plural) effective positioning points, then the positioning engine server 104 determines that the center of gravity of the (plural) effective positioning points is the best positioning point.

In some embodiments, after the positioning engine server 104 obtains the best angles of arrival (such as the angle of arrival from antenna units A2 and A5 in the direction ② antenna unit group and the angle of arrival from antenna units A5 and A7 in the direction ④ antenna unit group), the positioning engine server 104 can achieve the prediction and smoothing of the moving path by Wiener filter, Savotzky-Golay smoothing filter, Kalman filter, moving average filter, convolution calculation, correlative mean field filtering, coherence calculation, cross-correlation calculation, artificial intelligence (AI), and other methods according to the historical positioning records related to the best angles of arrival.

Figure 4:
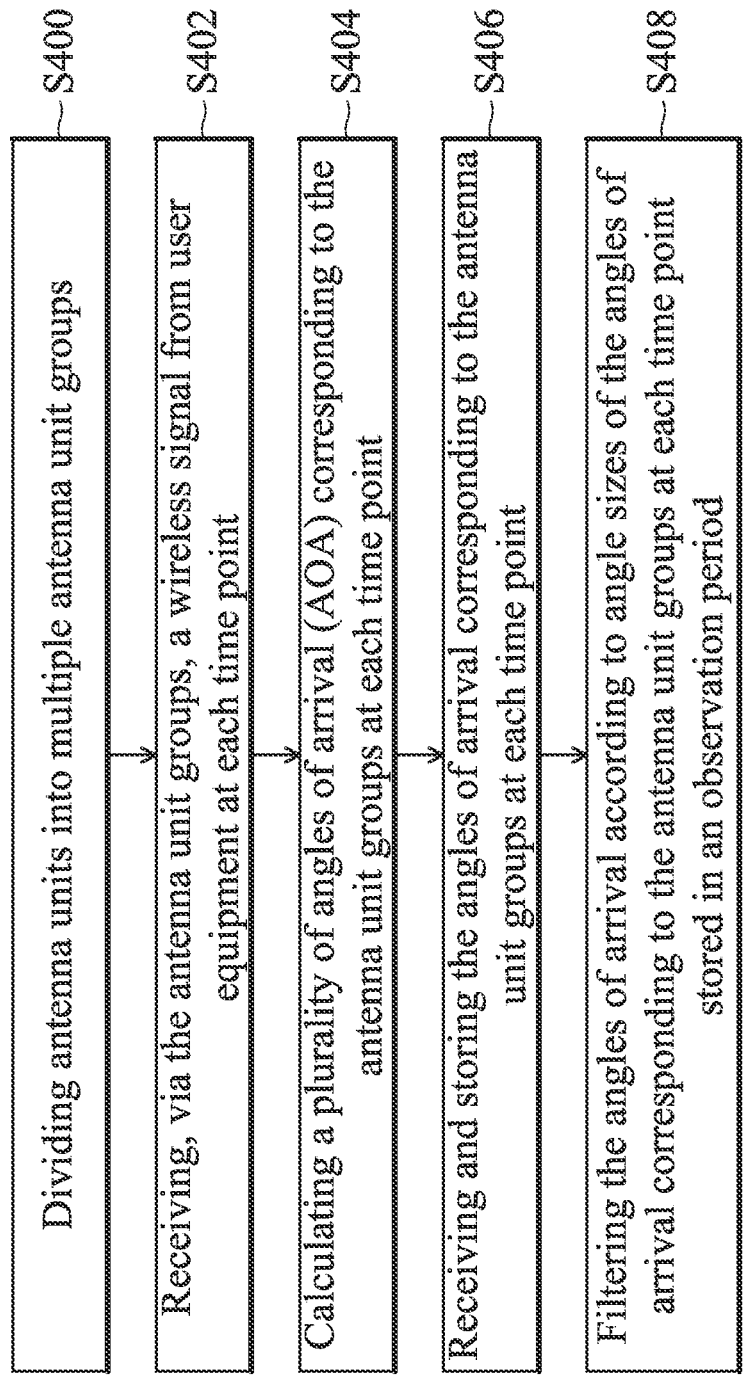
FIG. 4 is a flow chart of a method for improving angles of arrival in accordance with some embodiments of the disclosure.

FIG. 4 is a flow chart of a method for improving angles of arrival in accordance with some embodiments of the disclosure. The method for improving the angle of arrival of the present invention is applicable to an indoor positioner (such as the indoor positioner 102) having an array antenna (such as the array antenna 110 in FIG. 1) including a plurality of antenna units (such as antenna units A1-A9 in FIG. 2), and a positioning engine server (such as the positioning engine server 104 in FIG. 1). The method for improving the angle of arrival of the present invention includes: dividing antenna units into multiple antenna unit groups (step S400); receiving, via the antenna unit groups, a wireless signal from user equipment at each time point (step S402); calculating a plurality of angles of arrival (AOA) corresponding to the antenna unit groups at each time point (step S404); receiving and storing the angles of arrival corresponding to the antenna unit groups at each time point (step S406); and filtering the angles of arrival according to the angle sizes of the angles of arrival corresponding to the antenna unit groups at each time point stored in an observation period (step S408).

In some embodiments, the controller 112 of the indoor positioner 102 in FIG. 1 executes steps S400, S402, and S404. The positioning engine server 104 in FIG. 1 executes steps S406 and S408.

The ordinals in the specification and the claims of the present disclosure, such as "first", "second", "third", etc., have no sequential relationship, and are just for distinguishing between two different components with the same name. In the specification of the present disclosure, the word "couple" refers to any kind of direct or indirect electronic connection. The present disclosure is disclosed in the preferred embodiments as described above, however, the breadth and scope of the present disclosure should not be limited by any of the embodiments described above. Persons skilled in the art can make small changes and retouches without departing from the spirit and scope of the disclosure. The scope of the disclosure should be defined in accordance with the following claims and their equivalents.

What is claimed is:

1. An electronic device, comprising:
an indoor positioner, having an array antenna comprising a plurality of antenna units; wherein the indoor positioner divides the antenna units into multiple antenna unit groups, uses the antenna unit groups to receive a wireless signal from user equipment at each time point, and calculates a plurality of angles of arrival (AOA) corresponding to the antenna unit groups;
a positioning engine server, receiving and storing the angles of arrival corresponding to the antenna unit groups at each time point, and filtering the angles of arrival according to angle sizes of the angles of arrival corresponding to the antenna unit groups at each time point stored in an observation period;
wherein the indoor positioner comprises a controller; the controller divides the antenna units into a first direction antenna unit group, a second direction antenna unit group, a third direction antenna unit group, and a fourth direction antenna unit group according to the relative positional relationship of at least two of the antenna units in the array antenna;
wherein the positioning engine server respectively discards the highest and lowest of the angles of arrival from the first direction antenna unit group, the second direction antenna unit group, the third direction antenna unit group, and the fourth direction antenna unit group at each time point stored in the observation period so as to delete outliers in the angles of arrival and calculates a first trim mean corresponding to the angles of arrival from the first direction antenna unit group, the second direction antenna unit group, the third direction antenna unit group, and the fourth direction antenna unit group at each time point stored in the observation period based on the remaining angles of arrival;
wherein the positioning engine server calculates a standard deviation corresponding to the angles of arrival from the first direction antenna unit group, the second direction antenna unit group, the third direction antenna unit group, and the fourth direction antenna unit group at each time point stored in the observation period, and deletes the outliers in the angles of arrival according to the standard deviation;
wherein the positioning engine server calculates a second trim mean corresponding to the angles of arrival from the first direction antenna unit group, the second direction antenna unit group, the third direction antenna unit group, and the fourth direction antenna unit group at each time point stored in the observation period, and deletes the outliers in the angles of arrival according to the second trim mean.

2. The electronic device as claimed in claim 1, wherein the indoor positioner switches polarization directions of the antenna unit groups at each time point, so that the antenna unit groups receive the wireless signal from the user equipment in different polarization directions, so as to increase the number of angles of arrival, calculated by the indoor positioner, corresponding to the antenna unit groups at each time point.

3. The electronic device as claimed in claim 1, wherein the positioning engine server only reserves one angle of arrival that corresponds to the first direction antenna unit group that is closest to the second trim value, the one angle of arrival that corresponds to the second direction antenna unit group that is closest to the second trim value, the one angle of arrival that corresponds to the third direction antenna unit group that is closest to the second trim value, and the one angle of arrival that corresponds to the fourth direction antenna unit group that is closest to the second trim value.

4. The electronic device as claimed in claim 3, wherein the positioning engine server calculates a first covariance corresponding to the one angle of arrival of the first direction antenna unit group at each time point in the observation period, a second covariance corresponding to the one angle of arrival of the second direction antenna unit group at each time point in the observation period, a third covariance corresponding to the one angle of arrival of the third direction antenna unit group at each time point in the observation period, and a fourth covariance corresponding to the one angle of arrival of the fourth direction antenna unit group at each time point in the observation period.

5. The electronic device as claimed in claim 4, wherein the positioning engine server compares the first covariance, the second covariance, the third covariance, and the fourth covariance, and selects at least two from the one angle of arrival of the first direction antenna unit group, the one angle of arrival of the second direction antenna unit group, the one angle of arrival of the third direction antenna unit group, and the one angle of arrival of the fourth direction antenna unit group according to a comparison result as the basis for calculating a positioning location.

6. A method, suitable for an indoor positioner and a positioning engine server, wherein the indoor positioner comprises a controller, and an array antenna comprising a plurality of antenna units; the method comprising:
dividing the antenna units into multiple antenna unit groups;
receiving, via the antenna unit groups, a wireless signal from user equipment at each time point;
calculating a plurality of angles of arrival (AOA) corresponding to the antenna unit groups at each time point;
receiving and storing the angles of arrival corresponding to the antenna unit groups at each time point; and
filtering the angles of arrival according to the angle sizes of the angles of arrival corresponding to the antenna unit groups at each time point stored in an observation period;
wherein the antenna units are divided into a first direction antenna unit group, a second direction antenna unit group, a third direction antenna unit group, and a fourth direction antenna unit group according to the relative positional relationship of at least two of the antenna units in the array;
wherein the operation of filtering the angles of arrival according to the angle sizes of the angles of arrival corresponding to the antenna unit groups at each time point stored in an observation period comprises:
respectively discarding, via the positioning engine server, the highest and lowest of the angles of arrival from the first direction antenna unit group, the second direction antenna unit group, the third direction antenna unit group, and the fourth direction antenna unit group at each time point stored in the observation period so as to delete outliers in the angles of arrival; and
calculating, via the positioning engine server, a first trim mean corresponding to the angles of arrival from the first direction antenna unit group, the second direction antenna unit group, the third direction antenna unit group, and the fourth direction antenna unit group at each time point stored in the observation period based on the remaining angles of arrival;
wherein the positioning engine server calculates a standard deviation corresponding to the angles of arrival from the first direction antenna unit group, the second direction antenna unit group, the third direction antenna unit group, and the fourth direction antenna unit group at each time point stored in the observation period, and deletes the outliers in the angles of arrival according to the standard deviation;
wherein the positioning engine server calculates a second trim mean corresponding to the angles of arrival from the first direction antenna unit group, the second direction antenna unit group, the third direction antenna unit group, and the fourth direction antenna unit group at each time point stored in the observation period, and deletes the outliers in the angles of arrival according to the second trim mean.

* * * * *